US011353471B2

(12) United States Patent
Harbers et al.

(10) Patent No.: US 11,353,471 B2
(45) Date of Patent: Jun. 7, 2022

(54) CALIBRATION AND/OR ERROR DETECTION IN AN OPTICAL MEASUREMENT DEVICE FOR BIOLOGICAL SAMPLES

(71) Applicant: Roche Diagnostics Operations, Inc., Indianapolis, IN (US)

(72) Inventors: Rik Harbers, Cham (CH); Marcel Thomann, Rotkreuz (CH)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 15/376,704

(22) Filed: Dec. 13, 2016

(65) Prior Publication Data

US 2017/0176478 A1 Jun. 22, 2017

(30) Foreign Application Priority Data

Dec. 17, 2015 (EP) .................................... 15200769

(51) Int. Cl.
*G01N 33/48* (2006.01)
*G01N 33/50* (2006.01)
(Continued)

(52) U.S. Cl.
CPC ..... *G01N 35/00693* (2013.01); *G01N 21/253* (2013.01); *G01N 21/274* (2013.01);
(Continued)

(58) Field of Classification Search
CPC ........... G01N 35/00693; G01N 21/474; G01N 21/253; G01N 21/31; G01N 21/274;
(Continued)

(56) References Cited

U.S. PATENT DOCUMENTS

2004/0042012 A1 3/2004 Sato
2007/0086006 A1 4/2007 Ebersole et al.
(Continued)

FOREIGN PATENT DOCUMENTS

CN 103528952 A 1/2014
CN 104198382 A 12/2014
(Continued)

OTHER PUBLICATIONS

English machine translation of JP 3838501 B2. (Year: 2021).*
English machine translation of JP 2005-230096 A. (Year: 2021).*

*Primary Examiner* — Russell S Negin
(74) *Attorney, Agent, or Firm* — Roche Diagnostics Operations, Inc.

(57) ABSTRACT

A method for calibration and/or error detection in an optical measurement device for biological samples having at least a first and a second measurement channel is described. The method comprises calculating an updated reference factor for the second measurement channel based on the first and second detection signals, comparing the updated reference factor with at least one current reference factors and depending on the result of the comparison, storing the updated reference factor as a current reference factor for use in a later measurement in the second measurement channel or keeping the current reference factors for use in a later measurement in the second measurement channel.

3 Claims, 8 Drawing Sheets

(51) Int. Cl.
*G01N 35/00* (2006.01)
*G01N 21/47* (2006.01)
*G01N 21/25* (2006.01)
*G01N 21/31* (2006.01)
*G01N 21/27* (2006.01)
*G01N 21/55* (2014.01)
*G01N 35/02* (2006.01)

(52) U.S. Cl.
CPC .......... *G01N 21/31* (2013.01); *G01N 21/474* (2013.01); *G01N 21/55* (2013.01); *G01N 35/026* (2013.01); *G01N 2201/127* (2013.01)

(58) Field of Classification Search
CPC ............... G01N 21/55; G01N 35/026; G01N 2201/127; G01N 21/01
See application file for complete search history.

(56) References Cited

U.S. PATENT DOCUMENTS

| | | | |
|---|---|---|---|
| 2008/0124749 | A1* | 5/2008 | Farnam ............ G01N 33/86 422/68.1 |
| 2010/0231907 | A1 | 9/2010 | Pien et al. |
| 2011/0001963 | A1 | 1/2011 | Durack |
| 2013/0100439 | A1 | 4/2013 | Yu et al. |
| 2013/0214177 | A1 | 8/2013 | Lai |
| 2015/0248524 | A1 | 9/2015 | Cobb et al. |

FOREIGN PATENT DOCUMENTS

| | | |
|---|---|---|
| CN | 200950139 Y | 9/2017 |
| JP | 2005-230096 A | 9/2005 |
| JP | 3838501 B2 * | 10/2006 |
| JP | 2009-053029 A | 3/2009 |
| WO | 1985/004018 A1 | 9/1985 |
| WO | 2013/134491 A1 | 9/2013 |
| WO | 2015/094303 A1 | 6/2015 |

* cited by examiner

CALIBRATION AND/OR ERROR DETECTION IN AN OPTICAL MEASUREMENT DEVICE FOR BIOLOGICAL SAMPLES

CROSS-REFERENCE TO RELATED APPLICATIONS

This application claims priority to EP 15200769.6, filed Dec. 17, 2015, which is hereby incorporated by reference.

BACKGROUND

The present disclosure relates to the systems and methods for calibration and/or error detection in an optical measurement device for biological samples.

In today's laboratories, optical measurement devices for biological samples can process a large number of samples in automated or semi-automated manner. This might include measuring optical properties of the sample in a plurality of different measurement positions or measurement channels and with a comparatively high throughput. In order to provide this functionality, an optical measurement device can include fairly complex mechanics to handle and process biological samples. The complexity of the automated or semi-automated optical measurement devices can lead to a multitude of errors and changes of the condition of the measurement device during operation.

For example, in some situations biological samples to be analyzed can be contained in cuvettes or other vessels. These cuvettes, or other vessels, might get damaged (e.g., crack or break) in the course of an automatic handling process. In other scenarios, light used in the analysis process can be guided to and from a measurement channel or position by optical fibers. The fibers might move, or break, during operation of the optical measurement device. In still other examples, foreign objects might partially, or completely, block a measurement channel.

In all these scenarios (and in many additional situations) a proper measurement of the biological samples can be impeded or even be prevented. This can have multiple adverse consequences. On the one hand, errors might go unnoticed and erroneous measurement results might be provided by the optical measurement device. On the other hand, swift tracking and avoidance of errors or other changes of the status of the optical measurement device can require a substantial amount of time and resources. This increases cost of ownership and down-time of the optical measurement device.

Therefore, there is a need for calibration and/or error detection in optical measurement devices.

SUMMARY

According to the present disclosure, a method for calibration and/or error detection in an optical measurement device for biological samples having at least a first and a second measurement channel is presented. The method can comprise, between measurements of biological samples in the second measurement channel of the optical measurement device, repeatedly performing a reference factor update process including. The method can further comprise obtaining one or more current reference factors for the second measurement channel. Each reference factor can be indicative of a relationship between measurement signals in the first and second measurement channels of the optical measurement device. The method can also comprise determining a detection signal of the first measurement channel, determining a detection signal of the second measurement channel, calculating an updated reference factor for the second measurement channel based on the first and second detection signals, comparing the updated reference factor with at least one of the one or more current reference factors, and, depending on the result of the comparison, storing the updated reference factor as a current reference factor for use in a later measurement in the second measurement channel or keeping the one or more current reference factors for use in a later measurement in the second measurement channel.

Accordingly, it is a feature of the embodiments of the present disclosure to provide for calibration and/or error detection in optical measurement devices. Other features of the embodiments of the present disclosure will be apparent in light of the description of the disclosure embodied herein.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
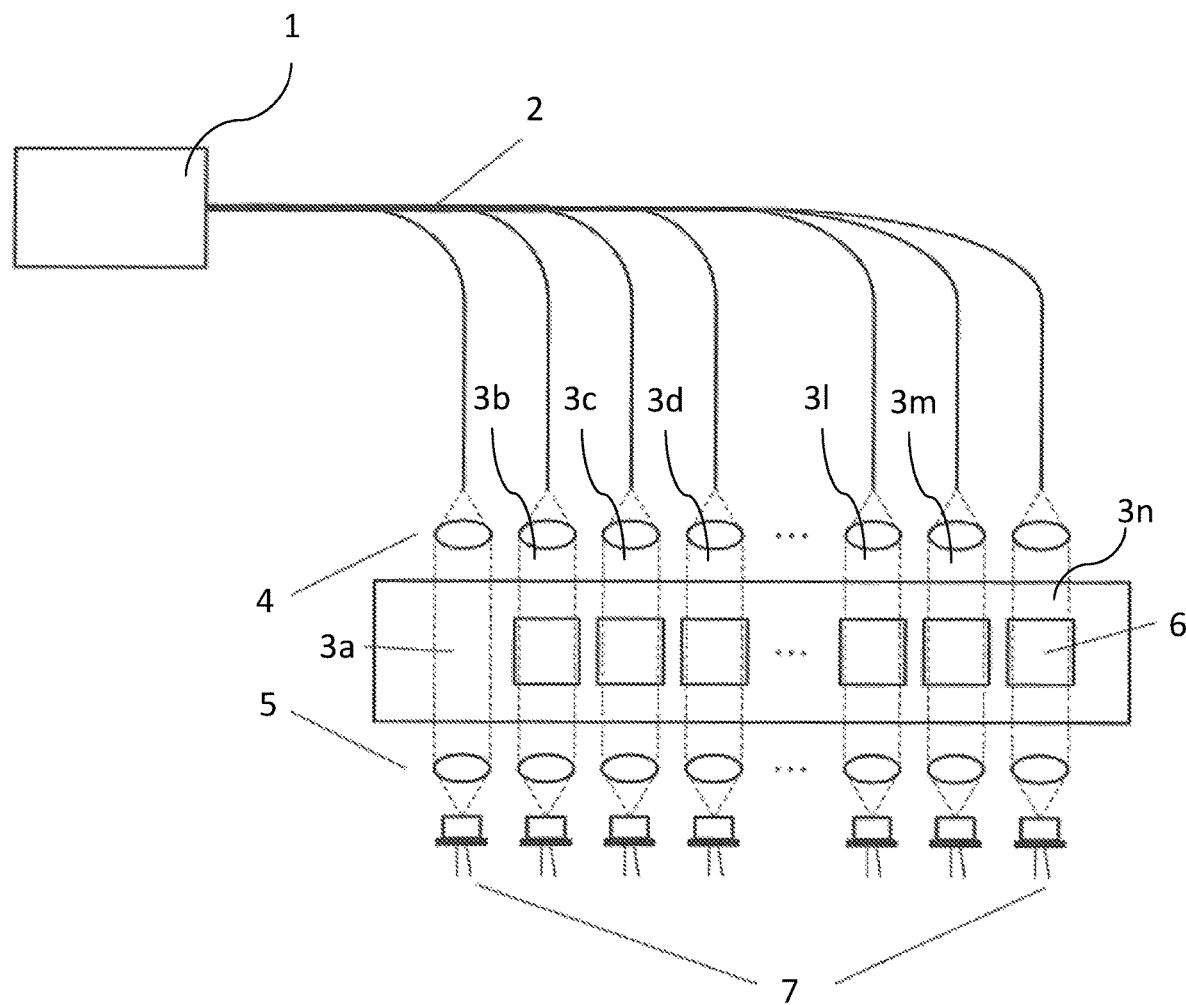
FIG. 1 illustrates an example optical measurement device for biological samples according to an embodiment of the present disclosure.

In the following detailed description of the embodiments, reference is made to the accompanying drawings that form a part hereof, and in which are shown by way of illustration, and not by way of limitation, specific embodiments in which the disclosure may be practiced. It is to be understood that other embodiments may be utilized and that logical, mechanical and electrical changes may be made without departing from the spirit and scope of the present disclosure.

A method for calibration and/or error detection in an optical measurement device for biological samples having at least a first and a second measurement channel is described. The method can comprise, between measurements of biological samples in the second measurement channel of the optical measurement device, repeatedly performing a reference factor update process comprising the steps of obtaining one or more current reference factors for the second measurement channel, each reference factor being indicative of a relationship between measurement signals in the first and second measurement channels of the optical measurement device, determining a detection signal of the first measurement channel, determining a detection signal of the second measurement channel, calculating an updated reference factor for the second measurement channel based on the first and second detection signals, comparing the updated reference factor with at least one of the one or more current reference factors and depending on the result of the comparison, storing the updated reference factor as a current reference factor for use in a later measurement in the second measurement channel or keeping the one or more current reference factors for use in a later measurement in the second measurement channel.

An optical measurement device for biological samples is also described. The optical measurement device can comprise a first measurement channel, a second measurement channel, a detector configured to receive signals from the first and second measurement channels and a controller configured to, between measurements of biological samples in the second measurement channel of the optical measurement device, repeatedly perform a reference factor update process comprising the steps of obtaining one or more current reference factors for the second measurement channel, each reference factor being indicative of a relationship between measurement signals in the first and second measurement channels of the optical measurement device, determining a detection signal of the first measurement channel, determining a detection signal of the second measurement channel, calculating an updated reference factor for the second measurement channel based on the first and second detection signals, comparing the updated reference factor with at least one of the one or more current reference factors and depending on the result of the comparison, storing the updated reference factor as a current reference factor for use in a later measurement in the second measurement channel or keeping the one or more current reference factors for use in a later measurement in the second measurement channel.

The method and the system can have one or more of the following advantages.

Firstly, in some examples, a plurality or all measurement channels of an optical measurement device can be continuously monitored. Error conditions can be swiftly detected such that using defective measurement positions can be avoided. This can prevent conducting faulty measurements in some examples. In addition, or alternatively, defective measurement channels can be identified in a comparatively short time after an error has occurred. In some examples, an optical measurement device can still be operated by using error-free measurement channels after an error in one or more measurement channels has been found. This may reduce the down-time of the optical measurement device.

Secondly, the techniques can be carried out continuously and comparatively non-intrusively in an optical measurement device. In this manner, a ratio between time that can be used for measuring operations and time that is used for maintenance can be improved in some examples. In addition, an optical measurement device can be operated for a longer time without significant deterioration of the measurement performance in some examples as a result of a continuous monitoring.

Thirdly, the techniques can provide for a continuous correction of the detection signals of the optical measurement device in some examples. For instance, the properties of different components of the optical measurement device can change in time (or temporarily change) due to aging or changes in ambient conditions. The techniques can be employed to correct for these changes in some examples. In particular, this correction process can happen on a "per measurement channel basis" so that different changes of different measurement channels can be coped with. In some known optical measurement devices, a relatively elaborate calibration process takes place only when the optical measurement devices are assembled or applied in the field for the first time. However, these devices might not be configured to monitor and correct for the changes of the device during its life time in an equally sophisticated manner. Therefore, measurement performance might degrade or extended down-time due to re-calibration might be required in these devices.

Fourthly, the technique can be adapted to a large variety of optical measurement devices in a fairly simple manner in some examples. For instance, reference factors can be generated and updated for each measurement channel of an optical measurement device independently from the reference factors of other measurement channels. In this manner, differences between the multiple measurement channels of an optical measurement device can be taken into account "automatically" by the technique, in some examples.

For instance, in an optical measurement device having a large number of measurement channels connected to a light source and a detector by optical fibers, different measurement channels can have (fairly) different properties. A first measurement channel in which the optical fibers are bent in a smaller radius might deliver a lower amount of useful light and be more sensitive to changes in ambient conditions than a second measurement channel in which the optical fibers are less strongly bent. Such differences do not have to be explicitly taken into account when employing the techniques but can be dealt with automatically in some examples.

In the same manner, a large variety of setups of optical measurement channels can be monitored by using the same technique. For instance, the techniques can be used without substantial modifications in fiber based or free-space optical measurement devices, or in devices measuring in transmission, reflection or a different configuration.

The term 'light' as used in the present disclosure can comprise but is not limited to radiation in the visible wavelength range. In some examples, light can include radiation having a wavelength of over 200 nm and below 10.000 nm (for instance, a wavelength between 350 nm and 1500 nm).

The terms 'measurement channel' and 'measurement position' can be used interchangeably in the present disclosure. A measurement channel or a measurement position can be configured so that a biological sample can be installed in a particular place and an optical measurement can be conducted on the biological sample. For instance, a measurement channel or a measurement position can comprise a mounting site adapted to mount a sample holder of a biological sample (e.g., a cuvette for a transmission measurement or a primary tube containing a biological sample). In other examples, different measurement channels can be defined by different beams of a free-space optical system. In this case, different measurement channels can comprise predetermined areas on a microscope slide, or other support substrate, which can carry a biological sample to be analyzed, e.g., different wells of a multi-well plate. As can be seen from these examples, the term 'measurement channel' and 'measurement position' may not be limited to a particular hardware setup of the optical measurement device.

The term 'optical measurement device for biological samples' can comprise any manual, semi-automated or automated measurement device configured to conduct optical measurements on biological samples. For instance, an 'optical measurement device for biological samples' can comprise an analyzer or an analytical work cell for analyzing biological samples.

The terms 'analyzer'/'analytical work cell'/'analytical unit' as used herein can encompass any apparatus, or apparatus component, that can measure analytical properties of a biological sample, e.g., following a reaction of a biological sample with a reagent for obtaining a measurement value. An analyzer can be operable to determine via various chemical, biological, physical, optical or other technical procedures a parameter value of the sample or a component thereof. An analyzer may be operable to measure the parameter of the sample, or of at least one analyte, and return the obtained measurement value. The list of possible analysis results returned by the analyzer can comprise, without limitation, concentrations of the analyte in the sample, a qualitative (yes or no) result indicating the existence of the analyte in the sample (corresponding to a concentration above the detection level), optical parameters, DNA or RNA sequences, data obtained from mass spectroscopy of proteins or metabolites and physical or chemical parameters of various types. An analytical work cell may comprise units for pipetting, dosing, and mixing of samples and/or reagents. The analyzer may comprise a reagent holding unit for holding reagents to perform the assays. Reagents may be arranged for example in the form of containers or cassettes containing individual reagents or group of reagents, placed in appropriate receptacles or positions within a storage compartment or conveyor. It may comprise a consumable feeding unit. The analyzer may comprise a process and detection system whose workflow may be optimized for certain types of analysis. Examples of such analyzer can be clinical chemistry analyzers, coagulation chemistry analyzers, immunochemistry analyzers, urine analyzers, haematology analyzers, nucleic acid analyzers, used to detect the result of chemical or biological reactions or to monitor the progress of chemical or biological reactions.

The term 'biological sample' can refer to material(s) that may potentially contain an analyte of interest. The biological sample can be derived from any biological source, such as a physiological fluid, including blood, saliva, ocular lens fluid, cerebrospinal fluid, sweat, urine, stool, semen, milk, ascites fluid, mucous, synovial fluid, peritoneal fluid, amniotic fluid, tissue, cultured cells, or the like. The biological sample can be pretreated prior to use, such as preparing plasma from blood. Methods of treatment can involve centrifugation, filtration, distillation, dilution, concentration and/or separation of sample components including analytes of interest, inactivation of interfering components, and the addition of reagents. A biological sample may be used directly as obtained from the source or used following a pretreatment to modify the character of the sample. In some embodiments, an initially solid or semi-solid biological material can be rendered liquid by dissolving or suspending it with a suitable liquid medium. In some embodiments, the sample can be suspected to contain a certain antigen or nucleic acid.

Referring initially to FIG. 1, an example optical measurement device for biological samples according to the present disclosure will be discussed. Subsequently, in connection with FIG. 2 to FIG. 4, different techniques of calibration and/or error detection in an optical measurement device for biological samples according to the present disclosure will be treated in more detail. Last, in connection with FIG. 5 to FIG. 8, aspects of the integration of an optical measurement device for biological samples according to the present disclosure in a system for in-vitro analysis will be discussed.

FIG. 1 shows a schematic drawing of an optical measurement device for biological samples including a first measurement channel $3a$, a second measurement channel $3b, \ldots 3n$, a detector 7 configured to receive signals from the first and second measurement channels $3a, \ldots 3n$ and a controller (not shown in FIG. 1) configured to, between measurements of biological samples in the second measurement channel $3b, \ldots 3n$ of the optical measurement device, repeatedly perform a reference factor update process including the steps of obtaining one or more current reference factors for the second measurement channel $3b, \ldots 3n$, each reference factor being indicative of a relationship between measurement signals in the first and second measurement channels $3a, \ldots 3n$ of the optical measurement device, determining a detection signal of the first measurement channel $3a$, determining a detection signal of the second measurement channel $3b, \ldots 3n$, calculating an updated reference factor for the second measurement channel $3b, \ldots 3n$ based on the first and second detection signals, comparing the updated reference factor with at least one of the one or more current reference factors and depending on the result of the comparison, storing the updated reference factor as a current reference factor for use in a later measurement in the second measurement channel $3b, \ldots 3n$ or keeping the one or more current reference factors for use in a later measurement in the second measurement channel $3b, \ldots 3n$.

In the example of FIG. 1 each second measurement channel $3b, \ldots 3n$ can comprise a respective optical fiber 2 for guiding light from light source 1 of the optical measurement device to a placement position 6 of a biological sample to be analyzed in the respective second measurement channel $3b, \ldots, 3n$. In addition, the detector 7 can comprise a plurality of dedicated detectors, one for each measurement channel $3a, \ldots 3n$. Moreover, each measurement channel $3a, \ldots 3n$ can be equipped with first optics 4 adapted to guide light by a respective fiber 2 of the measurement channel $3a, \ldots 3n$ towards the respective measurement area. Furthermore, each optical measurement channel $3a, \ldots 3n$ can comprise second optics 5 adapted to collect light emanating from the respective measurement area of the measurement channel and guide the collected light towards the respective detector 7. As can be seen in FIG. 1, the measurement channels $3a, \ldots 3n$ can operate in transmission (e.g., the measurement channels $3a, \ldots 3n$ can be arranged and configured so that light can pass through a biological sample sitting in a placement position 6 of the respective measurement channel $3b, \ldots 3n$).

In the example optical measurement device of FIG. 1, the first measurement channel $3a$ can be a fixed reference measurement channel (also referred to as 'reference channel' in the present disclosure). In other words, the reference factor update processes described in the present disclosure can use the first measurement channel $3a$ as reference channel during operation of the optical measurement device.

In some examples, the first measurement channel $3a$ can include no placement position for a biological sample. In addition, or alternatively, the first measurement channel $3a$ can comprise a reference placement position which can be configured in the same manner as the placement positions 6 of the (second) measurement channels $3b, \ldots 3n$ adapted to conduct actual measurement on biological samples. For instance, the reference placement position can comprise a sample holder and/or a sample vessel of the same type as the sample holders and/or a sample vessels used in the remaining measurement channels $3b, \ldots 3n$. In one example, the biological samples can be contained in a cuvette (or other vessel) during the measurement process. In this case, the reference placement position can comprise a reference cuvette (or another reference vessel) of the same type as the cuvettes (or other vessels) containing the biological sample to be analyzed.

In FIG. 1 a particular setup of the optical measurement device is illustrated which has been discussed in the preceding sections. In one example, the optical measurement device can be a photometer which operates in transmission.

However, this particular setup of the optical measurement device is merely illustrative. The techniques for calibration and/or error detection in an optical measurement device of the present disclosure is not limited to this setup, even if using the techniques for calibration and/or error detection in an optical measurement device of the present disclosure can have particular advantages in an optical measurement device as shown in FIG. 1. Rather, the techniques for calibration and/or error detection in an optical measurement device of the present disclosure can likewise be employed in many other optical measurement devices which can be configured (at least partially) differently than the optical measurement device depicted in FIG. 1. A non-exhaustive discussion of other measurement devices in which the techniques for calibration and/or error detection in an optical measurement device of the present disclosure can be employed will follow in the subsequent passages. Further aspects of the optical measurement devices of the present disclosure will be discussed in connection with FIG. 5 to FIG. 8.

In one example, the measurement channels of the optical measurement device can be configured to measure a biological sample in reflection. In this case, a reference channel can be equipped with a reflection measurement reference assembly. This reflection measurement reference assembly can include an element with predefined reflection properties (e.g., a white standard or grey standard).

In other examples, the measurement channels can be configured to measure a biological sample both in reflection and in transmission. In these examples, the optical measurement device can comprise separate reference measurement channels to provide reference measurements for a transmission and a reflection measurement to be used in the techniques for calibration and/or error detection in an optical measurement device of the present disclosure.

In addition, or alternatively, an optical measurement device can comprise multiple fixed reference channels for conducting reference measurements to be used in the techniques for calibration and/or error detection in an optical measurement device of the present disclosure.

Moreover, even though in the example of FIG. 1 the optical measurement device is equipped with a fixed reference measurement channel (i.e., the first reference measurement channel 3a), a reference measurement channel can be variable throughout the operation of the optical measurement device in other examples. For instance, a reference measurement channel can be selected dynamically during operation of the optical measurement device. In one example, the optical measurement device can be configured to monitor if a biological sample (e.g., a sample holder containing a biological sample is present in a particular measurement channel). Based on this information, the optical measurement device can dynamically select a measurement channel without a biological sample as reference measurement channel for a particular measurement. At a later stage, a different measurement channel can be selected as reference measurement channel.

In addition, or alternatively, the optical measurement devices of the present disclosure can include measurement channels that can be spatially arranged in a different manner than the measurement channels $3a, \ldots 3n$ depicted in FIG. 1. For example, the measurement channels can be arranged in a two dimensional array of measurement channels instead of a linear array. In addition, an optical measurement device can be equipped with two or more sets of arrays of measurement channels (e.g., arranged at different positions in the optical measurement devices to analyze different batches of biological samples).

Evidently, the number of measurement channels can be variable. In one example, an optical measurement device can include only two measurement channels (e.g., the first and second measurement channels discussed in connection with FIG. 1 above). However, in another example a number of measurement channels of the optical measurement device can be larger than two (e.g., larger than five, larger than ten or larger than fifty). The techniques for calibration and/or error detection described in the present disclosure can be applied to any number of measurement channels.

In connection with FIG. 1, a single light source 1 can supply light to a plurality of fibers 2. However, in other examples, the optical measurement device can include multiple light sources (e.g., one or more dedicated light sources per measurement channel). The type of the light source used can depend on the particular requirements of the analytic processes conducted on the biological sample. For example, the light source can include one or more LEDs or laser diodes, one or more halogen lamps or other discharge lamps. The techniques for calibration and/or error detection described in the present disclosure can be employed regardless of the configuration of a light source of a particular optical measurement device. Example light sources that can also be used in other optical measurement devices are discussed in connection with FIG. 5 to FIG. 8 below.

In addition, or alternatively, the light source of the optical measurement device can be configured to produce light in a single wavelength band or light in two or more different wavelength bands. In this manner, a measurement process can include a monochromatic measurement (e.g., a transmission measurement using light in a single wavelength band) or a spectrally resolved measurement (e.g., separate transmission measurements using light in two or more wavelength bands). In the case if a spectrally resolved measurement is conducted, the calibration and/or error detection techniques of the present disclosure can process dedicated reference factors for each spectral band. Further details of this process will be discussed in connection with FIG. 2 to FIG. 4 below.

It has been explained above that the calibration and/or error detection techniques of the present disclosure can be substantially independent of a particular configuration of a light source of an optical measurement device. The same can be true for the detector of the optical measurement device. Even though FIG. 1 depicts a detector 7 having discrete and dedicated detector elements for each measurement channel, the detector can be configured differently in other examples. For example, all measurement channels or a set of measurement channels can use a single detector (e.g., in a time-multiplexed manner or by attributing different areas of a multi-pixel detector to different measurement channels).

In one example, the optical measurement device may include a spectrometer (e.g., a transmission spectrometer)

configured to perform spectrally resolved measurements in a plurality of measurement channels.

Furthermore, the measurement channels can include any suitable optics to direct light towards a biological sample present in the measurement channel and collect light reflected from and/or transmitted through a biological sample present in a measurement channel. For instance, the optical measurement device can include a microscope setup having two or more microscope objectives for two or more measurement channels. In other examples, the optical measurement device can be arranged without any optics to direct light towards a biological sample, collect light from the biological sample, or both.

Additionally, even if the examples of FIG. 1, FIG. 5, FIG. 6 and FIG. 8 show optical measurement devices employing optical fibers, the calibration and/or error detection techniques of the present disclosure can also be used in different setups. In one example, the optical measurement device can guide light towards and from measurement areas in which biological samples can be placed at least partially by free-space optics (e.g., a transmission spectrometer having a plurality of free-space measurement channels).

It has already been discussed above that the optical measurement devices can be equipped with a variety of sample holders to place a biological sample in a measurement channel. For instance, the biological samples can be contained in a cuvette (or other vessel). In this case, each measurement channel can include a cuvette holder (or a holder for another vessel). In other examples, a biological sample can be carried by a microscope slide, or another support substrate. In this case, the optical measurement device (e.g., each measurement channel) can include a holder for the microscope slide, or other support structure. In still other examples, vessels or other carriers of biological samples can be assembled in a group including multiple biological samples (e.g., a rack including multiple vessels containing biological samples). In this case, the optical measurement device can include a holder configured to hold multiple biological samples and place them into a respective plurality of measurement channels (e.g., a rack holder).

In the preceding sections, different aspects of a system for calibration and/or error detection according to the present disclosure have been discussed in detail. In the following sections, aspects of methods for calibration and/or error detection according to the present disclosure will be discussed in connection with FIG. 2 to FIG. 4.

Figure 2:
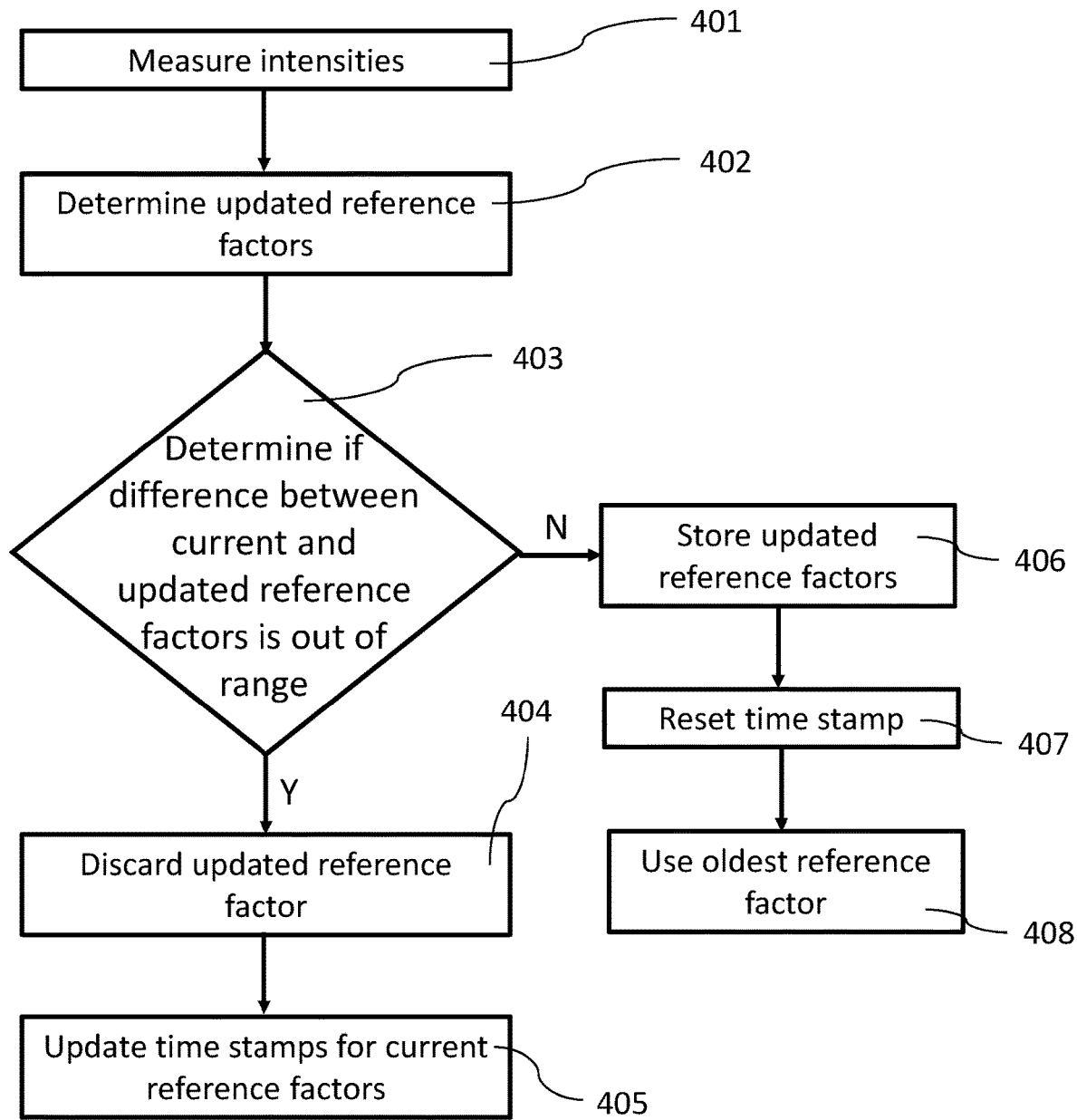
FIG. 2 illustrates a flow chart of an example reference factor update process according to an embodiment of the present disclosure.

FIG. 2 includes a flow diagram of a method for calibration and/or error detection in an optical measurement device for biological samples having at least a first and a second measurement channel. The method can comprise, between measurements of biological samples in the second measurement channel of the optical measurement device, repeatedly performing a reference factor update process including the steps of obtaining one or more current reference factors for the second measurement channel, each reference factor being indicative of a relationship between measurement signals in the first and second measurement channels of the optical measurement device, determining a detection signal of the first measurement channel 401, determining a detection signal of the second measurement channel 401, calculating an updated reference factor for the second measurement channel based on the first and second detection signals 402, comparing the updated reference factor with at least one of the one or more current reference factors 403, depending on the result of the comparison, storing the updated reference factor 406 as a current reference factor for use in a later measurement in the second measurement channel or keeping 404 the one or more current reference factors for use in a later measurement in the second measurement channel.

As set out above, the techniques of the present disclosure can employ reference factors for calibration and/or error detection in an optical measurement device. These reference factors and the steps of how they are determined (e.g., for determining the updated reference factors in operations 401 and 402 in FIG. 2) will be discussed in the subsequent passages.

In one example, a reference factor can indicate a ratio between a measured detection signal in a first measurement channel of the optical measurement device and a second measurement channel of the optical measurement device. For instance, the measured detection signal can be indicative of an intensity measured at the detector of the optical measurement device for a respective measurement channel. In general, the measurement channel whose detection signal is used in the denominator of the ratio can be the reference measurement channel (which might be one of multiple reference measurement channels or not be a fixed reference channel, as discussed above).

For instance, in some examples a reference factor RF for an i-th channel can be represented in the following form:

$$RF_i = IN_i / IN_{REF},$$

where $IN_i$ refers to a detection signal (e.g., a signal intensity) in the i-th measurement channel and $IN_{REF}$ refers to a detection signal (e.g., a signal intensity) in a reference measurement channel.

In other examples, detection signal (e.g., the signal intensity) in the i-th measurement channel and the detection signal (e.g., a signal intensity) in a reference measurement channel can be corrected by one or more correction operations before they are processed to determine a respective reference factor.

For example, the detection signal (e.g., a signal intensity) in a reference measurement channel, the detection signal (e.g., a signal intensity) in the i-th measurement channel can be corrected by a correction measurement in the respective measurement channel (e.g., a dark measurement in the respective measurement channel). In this case, a reference factor RF for an i-th measurement channel can be represented in the following form:

$$RF_i = (IN_i - IN_{DARK,i}) / (IN_{REF} - IN_{DARK,REF}),$$

where $IN_{DARK,i}$ refers to a dark signal in the i-th measurement channel and $IN_{DARK,REF}$ refers to a dark signal in the reference measurement channel. In other examples, the detection signal in the i-th measurement channel and the reference measurement channel can be corrected by other measured or calculated signal values other than a dark measurement signal.

In still other examples where the optical measurement device allows for spectrally resolved measurement, a distinct reference factor can be determined for each wavelength band of the spectrally resolved optical measurement device. For instance, a set of n wavelength bands (where n is an integer number larger than one) used by an optical measurement device can be denoted by $\lambda_1, \ldots \lambda_n$. The reference factor $RF_{i,\lambda_n}$ for the i-th measurement channel and the n-th wavelength band can be determined as:

$$RF_{i,\lambda_n} = IN_{i,\lambda_n} / IN_{REF,\lambda_n},$$

where $IN_{i,\lambda_n}$ stands for the detection signal (e.g., a signal intensity) in the i-th measurement channel in the n-th wavelength band and $IN_{REF,\lambda_n}$ stands for the detection signal (e.g., a signal intensity) in the reference measurement channel in the n-th wavelength band. In some examples, also in the case of a spectrally resolved measurement the detection signals of the i-th measurement channel and the reference measurement channel can be corrected as explained above. The correction terms can be wavelength-dependent (e.g., a separate correction term for each wavelength band) or one correction term can be used for two or more (or all) wavelength bands.

In some examples, there is no fixed reference measurement channel, or reference factors comparing a first measurement channel to a second measurement channel can be used. In these examples, a reference factor referencing the first measurement channel (i-th channel) to the second measurement channel (j-th channel) can be calculated as discussed above. For instance, such reference factor for a pair of the first and second reference channels can be calculated as:

$$RF_{i/j} = IN_i / IN_j.$$

Different techniques to calculate reference factors based on detection signals for the different measurement channels have been discussed above. The detection process of the detection signal will be shortly discussed next.

In general, the actual detection process (e.g., to detect signal intensities) may be immaterial for the calibration and/or error detection. However, in some examples, the parameters of the light source of the optical measurement device, the detector of the optical measurement device, or both can be kept constant for capturing the detection signals. For instance, an integration time of a detector can be kept constant when conducting the measurements for different reference factors. Moreover, the capturing of the detection signal may not have to involve a single measurement process. In one example, two or more measurements (e.g., taken in quick succession) can be used as detection signal to calculate the reference factors (e.g., by adding the two or more measurements or forming an average).

After having introduced the notion of a reference factor in the present disclosure, the actual use of these reference factors for calibration and/or error detection in an optical measurement device will be subsequently discussed in connection with FIG. 2.

In a first set of operations 401, 402, one or more updated reference factors can be determined. This can involve the techniques described above for calculating reference factors. The term 'updated' can signify that this process can take place, e.g., between two actual measurements on biological samples of the optical measurement device based on detection signals taken at that time. In some examples, the process can be repeated continuously between measurements on biological samples with the optical measurement device or continuously during operation of the optical measurement device. In other examples, the reference factor update process can be interrupted after detection of a predetermined interrupt trigger signal indicating that no measurement may take place in the near future. In still other examples, a continuous reference factor update process can be started after detection of a predetermined starting trigger signal indicating that a measurement may take place in the near future.

After a set of updated reference factors have been determined, at step 403, the optical measurement device can determine if a difference between current and updated reference factors is out of range. This can involve one or more of the operations as discussed below.

In one example, the optical measurement device can compare the updated reference factors to one or more current reference factors. One or more current reference factors can be kept on stock by the optical measurement devices of the present disclosure for use in the measurement processes on actual biological samples.

In one example, the step 403 can comprise (or consist of) comparing the updated reference factor with one current reference factor for a particular measurement channel. In this case, if the updated reference factor deviates at most by a predetermined value from the current reference factor, the process can proceed to step 406 including storing the updated reference factor as a new current reference factor for use in a later measurement in the particular measurement channel (e.g., the second measurement channel introduced above).

On the other hand, if the updated reference factor deviates by more than the predetermined value from the current reference factor, the process can proceed to step 404 and keep the current reference factors for use in a later measurement in the particular measurement channel (e.g., the second measurement channel introduced above). Details regarding techniques of using the reference factor in measurements on biological samples will be discussed below in connection with FIG. 3.

The predetermined value can be a fixed value for all measurement channels of the optical measurement device, a fixed value for each measurement channels of the optical measurement device or a dynamic value for all or each measurement channels of the optical measurement device. For instance, a dynamic value can be dynamically adapted in response to operation parameters of the optical measurement device, environmental conditions of the optical measurement device, or both. In other examples, techniques similar to the techniques described below to estimate an expected change of a reference factor can be used to dynamically adapt the predetermined value.

The above discussed steps will subsequently be illustrated by an example. The example optical measurement device can comprise a fixed reference measurement channel and five measurement channels for performing actual measurements on biological samples. At a certain point in time between two measurements on biological samples, the current reference factors for the five measurement channels can be $RF_1=1.05$, $RF_2=1.07$; $RF_3=0.99$, $RF_4=0.95$ and $RF_5=1.01$. A set of updated reference factors can be determined at that time to be $RF_1=1.03$, $RF_2=1.05$; $RF_3=0.59$, $RF_4=0.96$ and $RF_5=0.99$. A comparison of the current reference factor and the updated reference factor for each measurement channel can yield $\Delta_1=-0.02$, $\Delta_2=-0.02$; $\Delta_3=-0.4$; $\Delta_4=0.01$ and $\Delta_5=-0.02$ (where "$\Delta_n$" can refer to a difference between the current and the updated reference factor for the n-th measurement channel). In the present example, a predetermined value for the comparison step can be fixed at 0.05. Thus, the (absolute value of the) changes of the reference factors can be below the predetermined value for all measurement channels but the third measurement channel. This may mean that a biological sample has been introduced into the third measurement channel or that an error occurred which can affect the third measurement channel (further details of the interpretation will be discussed below). In any case, the processor of the optical measurement device can store the update reference factors whose change compared to the current reference factor is lower than the predetermined value as new current reference factors for the respective measurement channels (i.e., the first, second, fourth and fifth measurement channels). On the other hand, the updated reference factor of the third measurement channel can be discarded.

The above described determination processes of updated reference factors can be repeated multiple times between two measurements, i.e., as long as no biological sample is present in a predetermined measurement channel (in other words, as long as the measurement channel is "empty"). For instance, the determination processes of updated reference factors can take place periodically (e.g., with a period of less than one minute or less than one second). In one example, the period of the determination processes of updated reference factors can be chosen to be equal to a measurement time of a biological sample in a respective measurement channel or a period can be between 1.1 and 5 times longer than a measurement time of a biological sample in a respective measurement channel.

In addition, or alternatively, an update process of the reference factors can happen at the same time for two or more measurement channels (e.g., all measurement channels) of the optical measurement device. In other examples, at a predetermined time the reference factors of only one or a subset of all measurement channels can be updated by using the process discussed above.

Returning to the example of FIG. 2, in a particular reference factor update operation time stamps of the current reference factors can be updated in steps 405 and 407. The idea and use of time stamps for the reference factors will be discussed in further detail subsequently.

In some examples of the present disclosure, each current reference factor can be associated with a time stamp indicating when the particular reference factor has been determined. These time stamps can be used in the actual measurement processes or for error detection, as will be discussed in more detail below.

In one example, a time stamp can include information indicative of a period of time since a particular reference factor was determined (this is also referred to as "relative time stamp"). For instance, a time stamp can indicate a number of second or a number of fractions of seconds that have passed since the particular reference factor has been determined.

In other examples, a time stamp can include information indicative of a point in time when a particular reference factor was determined (this is also referred to as "absolute time stamp"). For instance, a time stamp can indicate one or more of a date and time when a particular reference factor was determined. The time can include one or more of an hour of the day, a minute of the hour, a second of the minute and a fraction of the second.

Regardless of whether a time stamp indicates a period or a date and/or time, a format and thus a granularity of the timing information can be freely chosen. In some examples, it may be sufficient to provide the date or the hour when the reference factor was determined. Accordingly, a period included in the time stamp can be measured in full hours or in full minutes. In other examples, a duration or a point in time indicated by the time stamp can be exact to the sub-second range.

The example of FIG. 2 uses time stamps indicating a period of time since the reference factor has been determined (i.e., a relative time stamp). Therefore, the time stamps can be regularly updated. For example, in step 405 the time stamps of the current reference factor(s) can be updated for measurement channels whose updated reference factors have been discarded.

For updated reference factors which become current reference factors (step 406), a new time stamp can be generated indicating the period since determination of the reference factors. In other words, the time stamp of the reference factor(s) of the respective measurement channels can be reset (step 407). In other examples in which the reference factors indicate a point in time ("absolute reference factor"), it may not be necessary to update the time stamps of the current reference factors (step 405).

As already discussed above, the processes of determining updated reference factors, discarding or keeping the updated reference factors as current reference factors and updating or generating time stamps can happen repeatedly or even continuously as long as the optical measurement device operates. For instance, the optical measurement device may start again with step 401 of FIG. 2 as soon as (or a predetermined time after) a previous run through the process of FIG. 2 has been completed. In this manner, the reference factors can be constantly "refreshed" to take into account variations in the optical measurement device. In addition, errors and sudden changes of the optical measurement device can be diagnosed without undue delays.

In some examples, the process of FIG. 2 can be also carried out when actual measurements take place in a particular measurement channel on a biological sample (and not only between two measurements). Evidently, the updated reference factors determined when a biological sample is present in a respective measurement channel should be discarded (since the change in the reference factor is not due to drifts of the optical measurement device which can be accounted for by using an updated reference factor as current reference factor). In some examples, this can be provided for by selecting the predetermined value used in the comparison step of a current reference factor with an updated reference factor such that a present sample can induce a change of the reference factor which can be larger than the predetermined value. This can result in discarding the updated reference factors as long as a biological sample is present in a measurement channel (i.e., a measurement takes place). This can mean that, e.g., in the example of FIG. 2 the process can always follow the "yes-path" and only update the time stamps of the current reference factors. Repeating the determination process of the updated reference factors irrespective of whether a measurement takes place or not can simplify the calibration and/or error detection in some examples as the process can be left "blind" to whether a biological sample is actually present in a particular measurement channel. The process can intrinsically detect when a measurement takes place (through an abrupt change in the reference factor) and discards updated reference factors determined during this period of time. As soon as the biological sample is removed from the measurement channel, the updated reference factors may again be close to the respective current reference factors.

Several possible variations of the preceding examples will be discussed subsequently.

In one example, the determination step 403 can happen with a predetermined delay after determination of an updated reference factor (step 402). For instance, a delay can be introduced by inserting a determined updated reference factor in a buffer memory (e.g., a ring buffer or another first in last out memory) and leaving the updated reference factor in the buffer for a predetermined delay period. In some examples, the optical measurement device can determine further updated reference factors in the meantime before the determined reference factor is retrieved from the buffer memory for further processing.

In one example, the delay can be selected so that using updated reference factors determined during insertion or removal of a cuvette or other vessel containing a biological sample can be avoided. In other words, using erroneous reference factors that quantify changes of a detection signal which are attributable to the insertion or removal process can be avoided. In one example, the delay period can be selected longer (e.g., 1.1 times as long or longer or 5 times as long or longer) than a required time of a particular analyzer including an optical measurement device of the present disclosure to insert a cuvette or other vessel into or remove a cuvette or other vessel from a measurement channel.

In another example, the optical measurement device can continuously measure the detection signals in the measurement channels and determine the updated reference factor (e.g., steps 401 and 402 in FIG. 2) and store the resulting updated reference factors in a buffer memory. In addition, the optical measurement device can continuously retrieve the oldest reference factor from the buffer memory and can carry out the determination step 403. If the oldest updated reference factor deviates from a current reference factor of the respective measurement channel by less than a predetermined value, the updated reference factor can be used as a current reference factor in subsequent measurement operations.

In some examples, the optical measurement device can keep more than one current reference factors (e.g., two, three or more than three reference factors) for each measurement channel. For example, the optical measurement device can keep a plurality of most recent current reference factors (e.g., two, three or more than three current reference factors). In addition, the optical measurement device can keep one or more initial reference factors for each measurement channel in some examples. In these examples, an update process can include comparing a determined updated reference factor with a youngest of a set of current reference factors and discarding or keeping the determined updated reference factor depending on the result of the comparison (as explained above). If the determined updated reference factor is discarded, the multiple current reference factors can be kept (and, if necessary, their time stamps can be updated). If, on the other hand, the determined updated reference factor is kept, the oldest current reference factor of the set of multiple current reference factors can be discarded and the determined updated reference factor can be stored (see step 406). In these examples, the oldest current reference factor can be used in measurement processes on biological samples (step 408 in FIG. 2). In some examples, the current reference factor can be organized in a buffer memory (e.g., in a ring buffer or another first-in-last-out memory).

In still other examples in which multiple current reference factors are kept, the determination step 403 may include a comparison of a determined updated reference factor with more than one current reference factor (or with an average value of multiple current reference factors). In addition, or alternatively, a determined updated reference factor may be compared to one or more initial reference factors (and discarded if the determined updated reference factor deviates by more than a predetermined value from the one or more initial reference factors). This can be helpful to identify slow drifts in the optical measurement device.

In the example of FIG. 2, an updated reference factor can either be kept or discarded depending on the result of a comparison of the updated reference factor and a current reference factor (step 403). However, in addition, or alternatively, an error message can be produced in reply to comparing the updated reference factor to the current reference factor in some situations. For instance, a deviation of the updated reference factor from a current reference factor may be indicative of an error in the device (e.g., when a reference factor can increase by a large quantity). The error message can be used by the optical measurement device in different ways. For instance, a measurement channel for which an error message has been produced can be flagged by the optical measurement device. In addition, or alternatively, the optical measurement device can prevent further measurements in the measurement channel for which an error message has been generated.

An additional optional step of the determination step 403 can comprise estimating a change of a reference factor and discarding an updated reference factor if the comparison updated reference factor does not change according to the estimated change. For example, an expected change can be determined based on one or more environmental or device-related factors. For instance, the optical measurement device can determine that a detection signal of the reference measurement channel, the measurement channel for receiving the biological sample, or both can be expected to change in a way that would influence a value of the reference factor.

For example, it can be detected that an ambient light level at a detector of the reference channel can increase and the ambient light level at a particular measurement channel can remain unaltered (or vice versa). This can result in a sudden change in the value of a reference factor (e.g., determined as a ratio of a detection signal of the measurement channel and the reference channel). In other examples, a modification in either the reference channel or the measurement channel can result in an expected change in the reference factors (e.g., insertion, or removal, of a grey filter in the light path of one of the channels or insertion, or removal, of an empty reference vessel such as a cuvette in the reference channel). Again, a magnitude of the reference value may change in response to such modification.

In case of expected changes, or changes, detected by additional sensors, the optical measurement device can take into account the change in the reference factor update process. In one example, the comparison step of the current and the updated reference factor can be modified to take into account the expected change in the reference factor (for instance, if a detection signal of a reference channel is expected to increase by 20% due to a removal of a reference cuvette), a current reference factor can be increased accordingly to allow a continued comparison of updated and current reference factors as described above. In alternative examples, the optical measurement device can carry out an additional, or alternative, comparison step to check if the reference factor changes as expected.

In the preceding passages, several techniques have been presented which include discarding an updated reference factor when the updated reference factor deviates from a current reference factor by more than a predetermined value and/or generating an error message for the particular measurement channel for which this deviation has been detected. In this manner, it can be avoided that erroneous reference factors are used in the measurement process. The overly large change in the reference factor can be caused by insertion of a sample into a measurement path or an error of the measurement device, as discussed above. Particular errors which can result in an overly large change in the reference channel (and which can be detected by the optical measurement device using the techniques described herein) include cracking or breaking of an optical fiber employed in a particular measurement channel, a predetermined amount of dust or dirt which has accumulated in a particular measurement channel, cracking or breaking of a sample vessel inserted in a particular measurement channel, presence of stray fluid in a measurement channel, a deterioration of a light source or a detector for a particular measurement channel or a group of measurement channels, a defect in a light source or a detector for a particular measurement channel or a group of measurement channels, electronic defects of the optical measurement device or errors in processing detection signals of the detector(s) of the optical measurement device. In some examples, the techniques of the present disclosure can detect all these error conditions by using a single process (e.g., as shown in FIG. 2). On the other hand, non-critical changes of the optical measurement device can be used in a (quasi-continuous) calibration process by using the same technique.

In the previous sections, details of the reference factor update techniques of the present disclosure have been discussed in connection with FIG. 2. In the following, it will be explained in connection with FIG. 3 how the reference factors (and the time stamps of the reference factors) can be used in an actual measurement process.

The measurement process can start with the receipt of a measurement order (step 301). Subsequently, the optical measurement device can check if a current reference value of measurement channel for which the measurement order was received is older than a predetermined threshold value at step 302.

In cases where the time stamps indicate a period of time since the determination of respective reference factor, checking the age of the current reference factor may include comparing the time stamp to the predetermined threshold value directly. If the time stamps indicate a point in time (e.g., a time and or date at which the current reference factor was determined), an age of the current reference factor can be determined by comparing the time stamp and a current system time.

Depending on the outcome of the age check, the particular reference channel can either be flagged (step 303) as unreliable if the current reference factor is too old or the measurement can be performed in the envisaged measurement channel (step 304).

In some examples, the predetermined threshold value can be selected to be longer than a measurement time of a biological sample in the respective measurement channel of the optical measurement device (e.g., 1.1 times as long or longer, twice as long or longer or five times as long or longer).

The fact that the age of a reference factor can be used to judge that a particular measurement channel may be defective can be understood in the context of the reference factor update process described in connection with FIG. 2 above. As discussed, the updated reference factors can be discarded as soon as a deviation to a current reference factor is overly large. If there is a persistent error in a particular measurement channel, the updated reference factors can continuously show large deviations to the current reference factor and hence can be discarded. At the same time, the current reference factor can age and eventually reach the predetermined threshold age. On the other hand, if at some point in time the updated reference factor returns to values sufficiently close to the current reference factor, the current reference factor can be replaced by the updated reference factor (which then is "fresh" enough so that it can pass the age test in step 302 of FIG. 3).

After the use of the time stamp to avoid measurements in faulty measurement channels has been discussed in the preceding sections, the use of the reference factors in the actual measurement process will be discussed in the following sections.

Once a biological sample has been introduced into a measurement channel, the optical measurement device can perform one or more measurements on the biological sample. The current reference factor of the measurement channel and a detection signal of the reference channel (or one of the reference channels) can be used to correct the detection signal.

In one example, a detection signal of the measurement channel can be weighted by the current reference factor (e.g., multiplied by the current reference factor). In this manner, the inhomogeneity between different measurement channels in an optical measurement device can be leveled.

For instance, a current reference factor of an i-th measurement channel $RF_i$ can be 1.1 when a measurement in the particular measurement channel is performed. Then, a corrected detection signal (e.g., an intensity or a number of counts) in the i-th measurement channel $IN_{i,CORR}$ can be calculated as:

$$IN_{i,CORR} = RF_i * IN_{i,det},$$

where $IN_{i,det}$ refers to a measured detection signal in the respective measurement channel. In the above example, the corrected detection signal (e.g., intensity or a number of counts) in the i-th measurement channel is 10% higher than the measured detection signal. For a further measurement channel, the corrected detection signal might be, e.g., 5% smaller than the measured detection signal. Thus, the use of reference factors can level inhomogeneities of the different measurement channels of the optical measurement device and make different detection signals more comparable.

The detection signal of a measurement channel can also be corrected in additional ways to using a current reference factor of the measurement channel. In one example, a detection signal of the reference measurement channel measured at the same time as the detection signal of the measurement channel including the biological sample can be used to correct the detection signal. In this manner, drifts during a measurement process (e.g., in a situation where sequential measurements are conducted on a single biological sample) can be corrected.

In one example, a corrected detection signal $D_{i,CORR}$ of the i-th measurement channel can be determined as follows:

$$D_{i,CORR} = RF_i * IN_{i,det} / IN_{REF,det},$$

where $IN_{REF,det}$ refers to a detection signal of the reference channel at the measurement time. In addition, or alternatively, the detection signals can be corrected by correction measurement in the respective measurement or reference channel (e.g., a dark measurement in the respective measurement channel) as described above in connection with the determination process of the reference factors. For instance, a dark measurement can be subtracted from the detection signals of the measurement channel and the reference channel.

Figure 3:
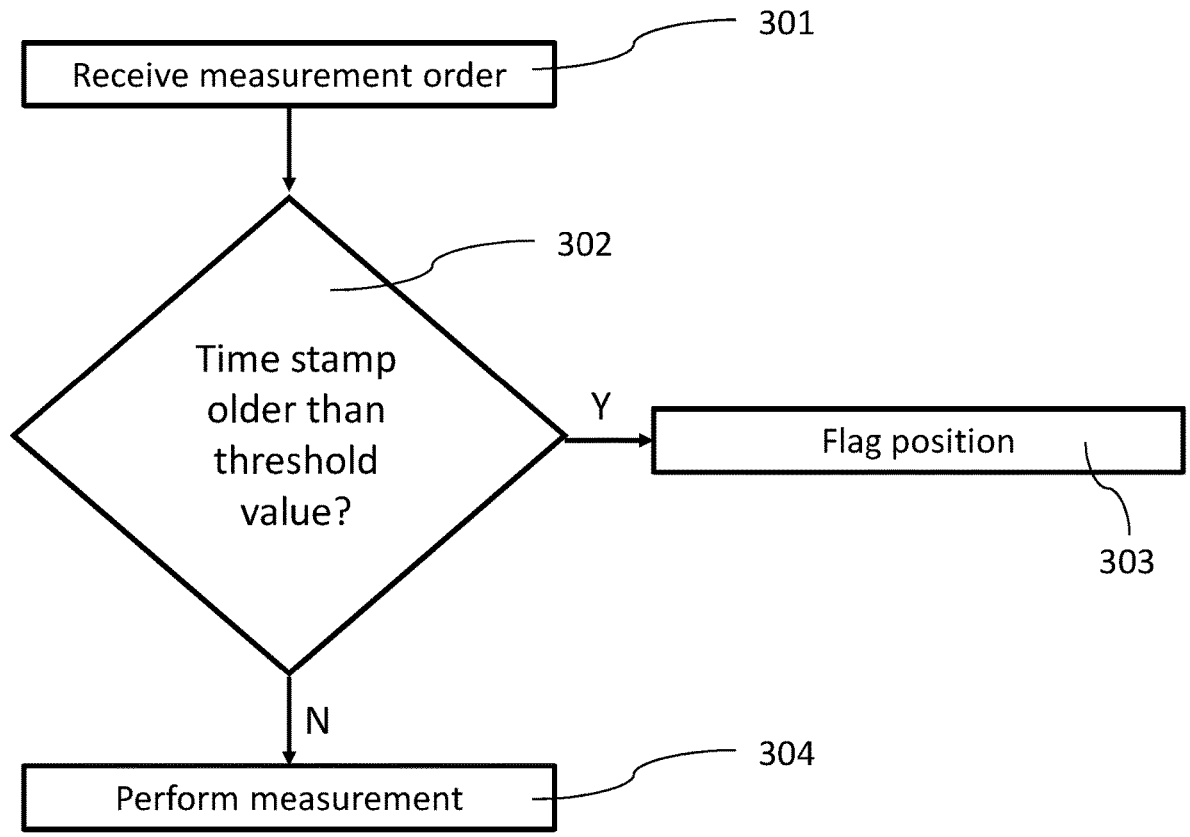
FIG. 3 illustrates a flow chart of an example measurement process according to an embodiment of the present disclosure.
Figure 4:
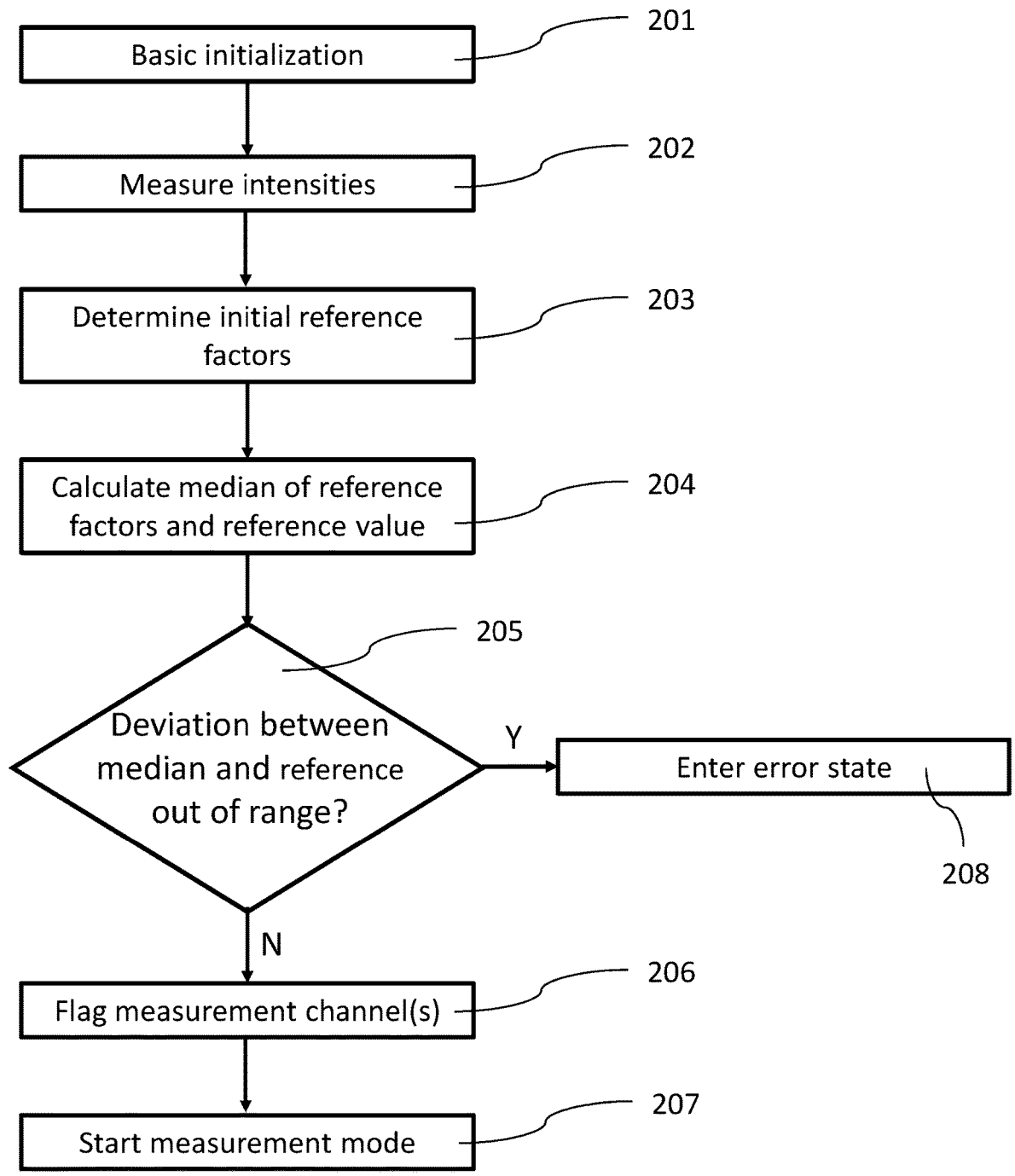
FIG. 4 illustrates a flow chart illustrating an example initialization process for an optical measurement device for biological samples according to an embodiment of the present disclosure.

After example reference factor update techniques and techniques of using reference factors in measurements of an optical measurement device have been discussed in connection with FIG. 2 and FIG. 3, aspects of initialization techniques will now be detailed in connection with FIG. 4.

During the initialization step, no biological samples may be present in the measurement channels (i.e., the measurement channels are empty).

At a first step 201, the optical measurement device can perform a basic initialization. This can involve a predetermined number of self-diagnostic tests to check whether the optical measurement device is functioning properly. In addition or alternatively, the optical measurement device can set an operating point for subsequent measurements (e.g., light source parameters, detector parameters and measurement time). In one example, a flat field correction process can be performed for all detectors, or detector pixels, of the optical measurement device.

In a subsequent step 202, the optical measurement device can measure detection signals of each measurement channel of the device. The measured intensities can then be used in step 203 to calculate a set of initial reference factors. For this calculation step of the initial reference factors the same techniques as set out above in connection with FIG. 2 for the reference factor update process can be used.

When the initial reference factors have been determined, the optical measurement device can calculate a median of the initial reference factors and a reference value (step 204). In other examples, another average value than the median (e.g., an arithmetic mean) can be calculated. In the example of FIG. 4, the reference value can be set to '1'. The reference value can represent the reference channel. As the reference factors of all other measurement channels are referenced to the detection signal of the reference channel, the reference value of '1' can indicate that an expected detection signal of the reference channel can equal an expected signal of the other measurement channels.

In a subsequent step 205, the optical measurement device can check if a deviation of the reference value and the median is out of range (e.g., the reference value deviates by more than a predetermined value from the median of the reference factors). If this is the case, the optical measurement device can enter an error state (step 208).

In addition, the optical measurement device can check if a deviation of the reference factors of each measurement channel and the median is out of range. If this is the case, the respective measurement channel is flagged as unusable (step 206).

After the initialization process has been completed, the optical measurement device can enter a measurement mode (step 207).

In other examples, the optical measurement device can employ different initialization techniques. An alternative initialization technique can involve calculating an average value for the reference factors of all measurement channels of the optical measurement device and, for each measurement channel, determining a deviation of a reference factor of the respective measurement channel and the average reference factor. If the deviation from the reference factor of a measurement channel and the average reference factor exceeds a predetermined limit, an error indicator can be generated for the respective measurement channel.

In the preceding passages, different aspects of calibration and/or error detection techniques in an optical measurement device for biological samples have been discussed in connection with FIG. 1 to FIG. 4. As already discussed, the optical measurement devices of the present disclosure can be integrated in different analyzers or analyzer units for biological samples. An example system for in-vitro analysis including an integrated optical measurement device according to the present disclosure is depicted in FIG. 5 to FIG. 8 and will be discussed in more detail subsequently.

FIG. 5 through FIG. 8 depict views of a system for in-vitro analysis generally referred to as reference numeral 100.

Figure 5:
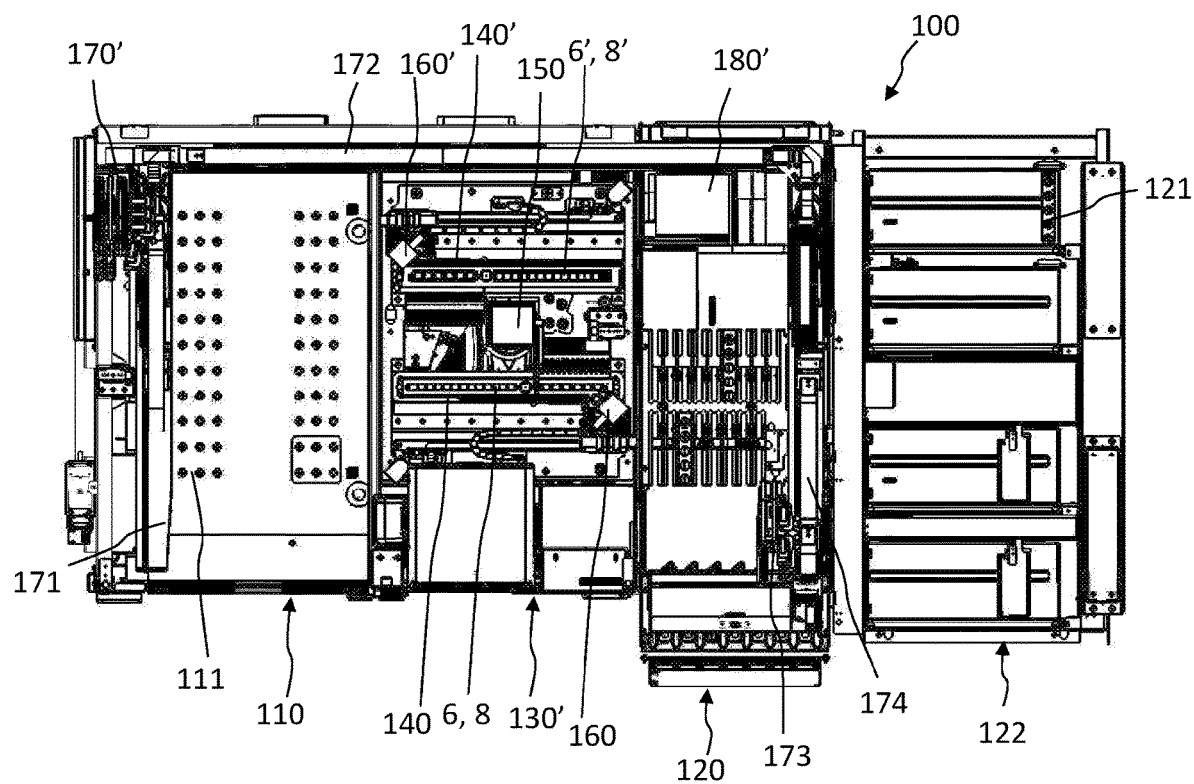
FIG. 5 illustrates an example system for in-vitro analysis including an example optical measurement device for biological samples according to an embodiment of the present disclosure.

FIG. 5 shows an example of a system 100 for in-vitro diagnostic analysis, and in particular, a coagulation analyzer. The system 100 can comprise a reagent holding unit 110 for holding reagents to perform different coagulation tests. The reagent unit 110 can be embodied as a closed and tempered storage compartment, comprising access holes 111 for a pipetting nozzle to enter the compartment and withdraw an aliquot of reagent. The system 100 can further comprise a sample rack tray unit 122, which can be functionally coupled as a module to the sample loading/unloading unit 120 for loading/unloading sample racks 121 into/from the sample loading/unloading unit 120. The system can further comprise a central vessel processing area 130'. The vessel processing area 130' can comprise a first linear static vessel holder 140 and a second linear static vessel holder 140'. The static vessel holders 140, 140' can each comprise a plurality of vessel placement positions 6, 8, 6', 8' for holding vessels including biological samples (e.g., while the biological samples are incubated, or while optical measurements are performed on the biological samples). The vessel processing area 130' can further comprise a vessel input station 150 for feeding a vessel at a time to the static vessel holder 140. The vessel processing area 130' can further comprise first and second movable vessel workstations 160, 161' linearly translatable with respect to the respective static vessel holder 140, 140' and functionally coupled to the respective static vessel holder 140, 140' to transfer vessels between vessel placement positions 6, 8 of the static vessel holder 140.

The system 100 can further comprise two pipette heads 170, 173 translatably mounted on two respective horizontal arms 171, 174 comprising a plurality of pipetting devices each. The system 100 can further comprise a controller 180' programmed to control the execution of a number of scheduled process operations including operation of the movable vessel workstations 160, 161', of the pipette heads 170', 173 and of the pipetting devices.

Figure 6:
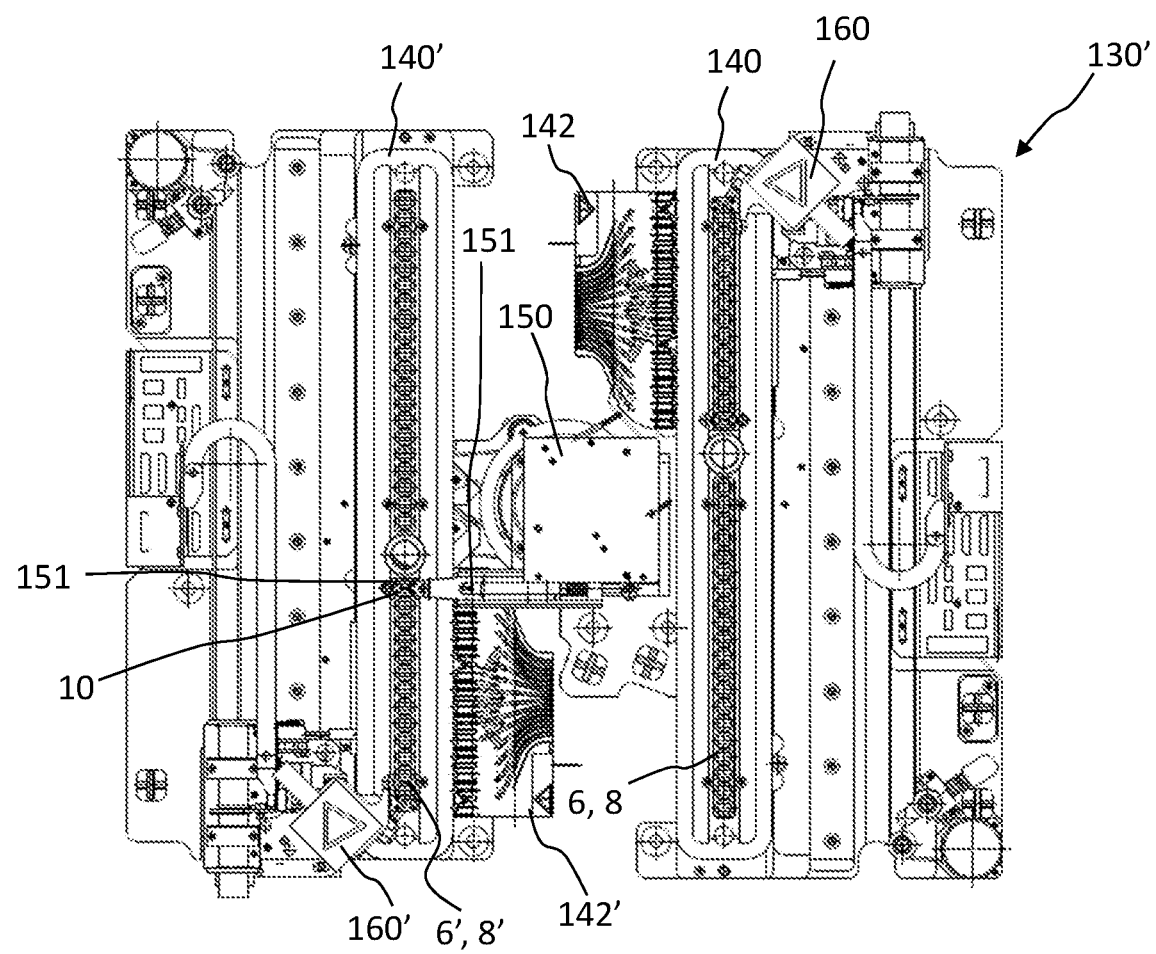
FIG. 6 illustrates a partial top view of the example system of FIG. 5 according to an embodiment of the present disclosure.
Figure 7:
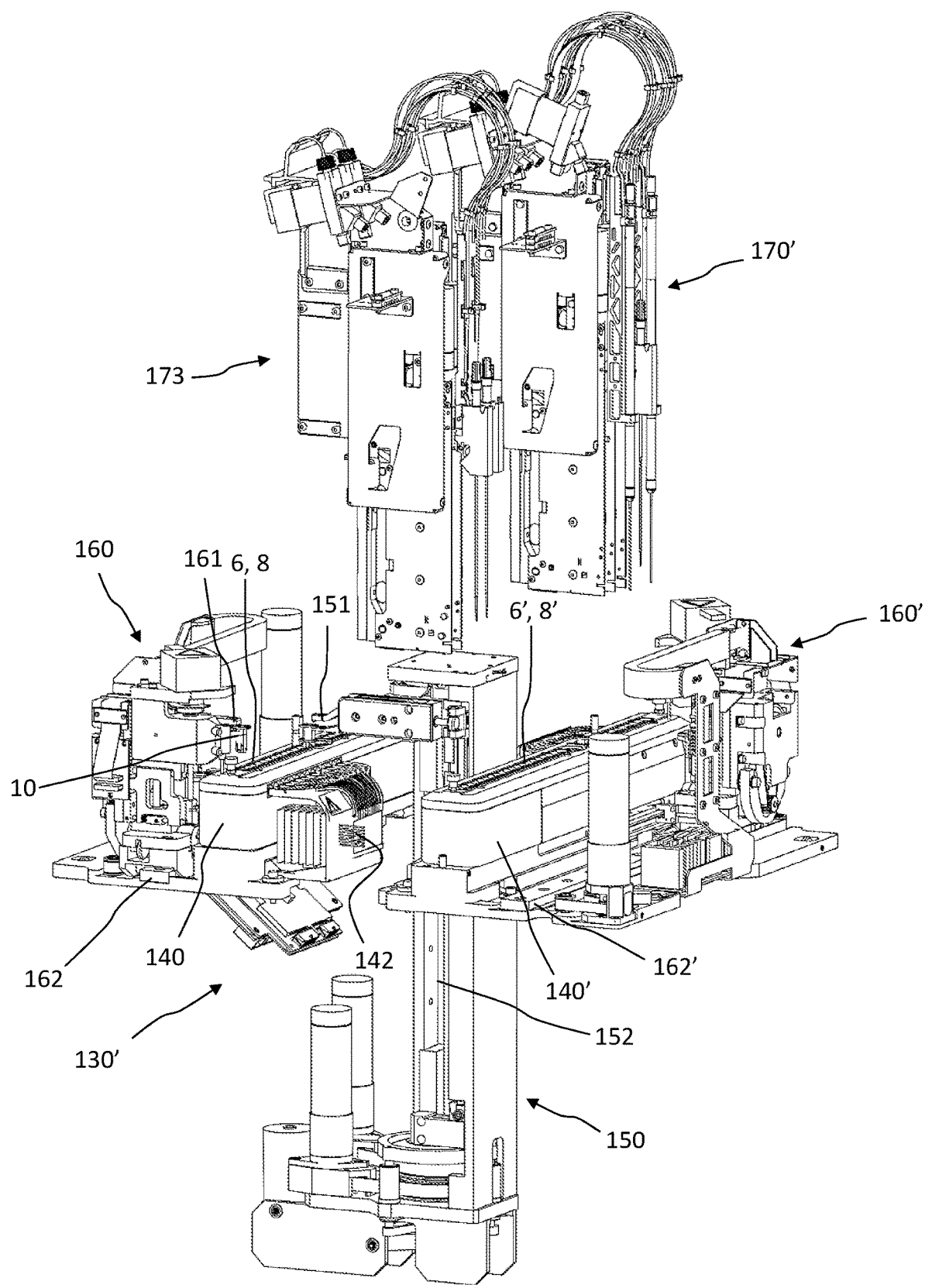
FIG. 7 illustrates some units of the example system of FIG. 5 in greater detail according to an embodiment of the present disclosure.

FIG. 6 and FIG. 7 show further views of the example system of FIG. 5 including the components discussed above. In particular, in FIG. 6 and FIG. 7 it can be seen that the system can comprise two photometric units 142, 142' for performing optical coagulation measurements on biological samples included in vessels 10. The photometric units 142, 142' will subsequently be discussed in more detail in connection with FIG. 8.

Figure 8:
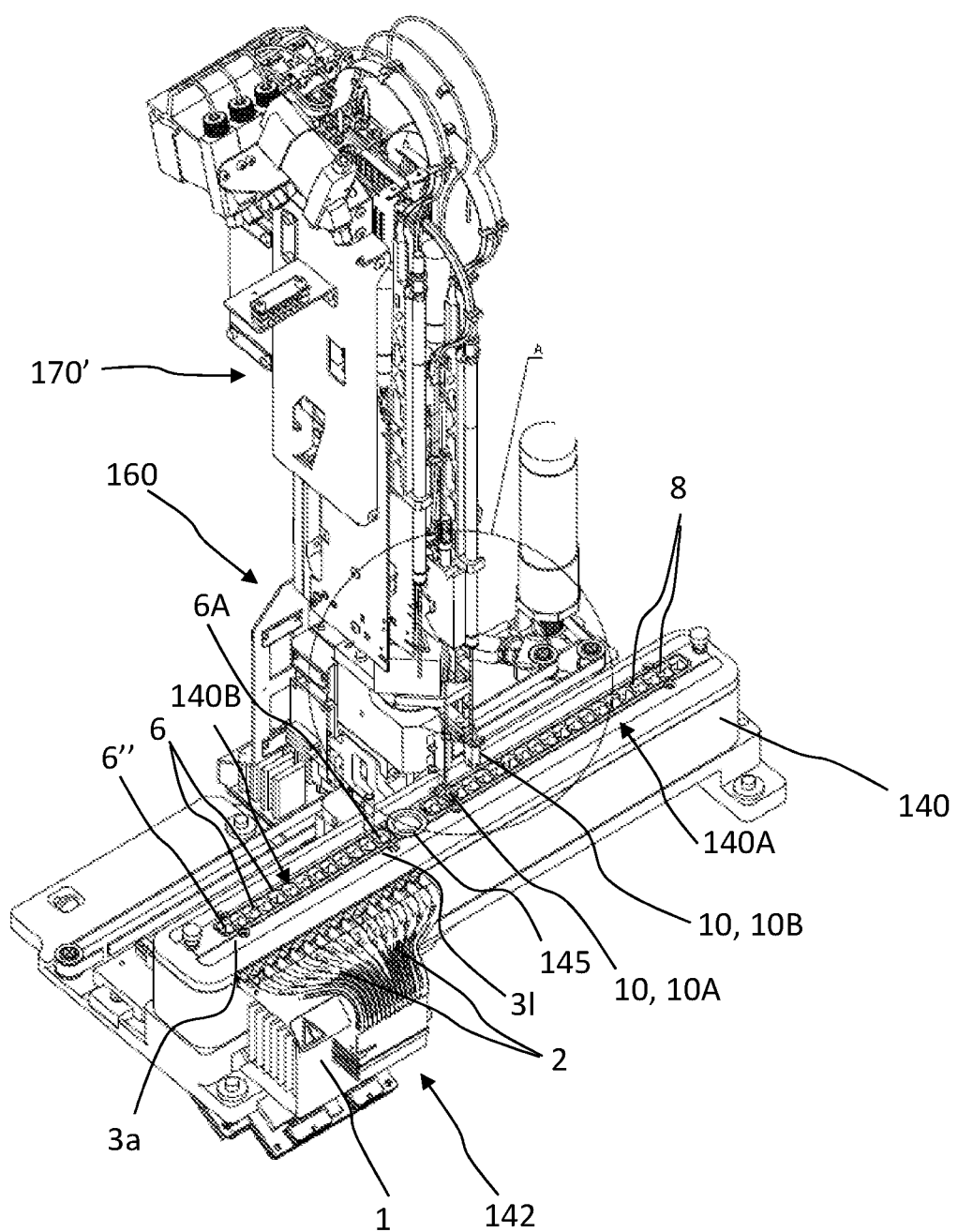
FIG. 8 illustrates the optical measurement device of FIG. 5 in greater detail according to an embodiment of the present disclosure.

FIG. 8 shows further details of parts of the example system of FIG. 5 and FIG. 6. In particular, only one static vessel holder 140 with the respective movable vessel workstation 160 and only one pipette head 170' are shown for clarity.

The static vessel holder 140 can comprise a plurality of vessel placement positions 6, 8 for placing a plurality of vessels 10. In one embodiment, the static vessel holder 140 can comprise an incubation subunit 140A comprising a plurality of vessel placement positions for incubation 8. The static vessel holder 140 can further comprise a detection subunit 140B comprising a plurality of vessel placement positions for detection 6 (for example, thirteen).

In one embodiment, the detection subunit 140B can comprise one of the photometric units 142. The photometric unit 142 can comprise a light source 1 on one side of the vessel placement positions for detection 6 and an optical detector arranged inside the detection subunit 140B on the other side of the vessel placement positions for detection 6. In one embodiment, for each vessel placement positions for detection 6, there can be an optical fiber 2 for guiding light from the light source 1 through a vessel 10 placed in the vessel placement positions for detection 6 and an optical detector placed on the opposite side of the vessel placement positions for detection 6 to detect light passing through the vessel 10 in the vessel placement positions for detection 6. Thus, each vessel placement position for detection 6 can be arranged in an optical path between an optical fiber 2 and an optical detector. Therefore, the system 100 can provide a plurality of measurement channels 3a, 3l (thirteen measurement channels in the example of FIG. 8, two of which 3a, 3l are shown in FIG. 8), where a vessel 10 can be arranged in a respective measurement channel 3a, 3l by placing it in the respective vessel placement positions for detection 6.

The vessels 10 can therefore conveniently be embodied as cuvettes comprising two parallel and transparent walls, which can be placed in the optical path. Light of different wavelengths may be guided through different optical fibers 2 and/or light of different wavelengths may alternately be guided in the same optical fibers 2. In one embodiment, the light source 1 may be common to all optical fibers 2 and can comprise a multi-wavelength light source, e.g. a broad spectrum light source or a plurality of light emitting elements with individual wavelengths or wavelength ranges.

One of the vessel placement positions for detection 6A can be a blank measurement position for taking a blank measurement of each new vessel 10. In addition, the blank vessel placement positions for detection 6A can be the input vessel holding position where a new vessel 10 at a time can be placed by the vessel gripper 151 of the vessel input station 150.

A second vessel placement positions for detection 6" can be a reference vessel placement positions for detection as discussed above. This vessel placement positions for detection 6" can be part of a reference channel 3a (as also discussed above).

An exemplary measurement process in the system of FIG. 5 to FIG. 8 is now described.

The vessel input station 150 can place a new vessel 10 at a time into the input vessel placement positions for detection 6 of the static vessel holder 140 and/or into a corresponding blank measurement position 6A of the second static vessel holder 140', depending on whether an embodiment with one or two static vessel holders 140, 140' is used. A photometric blank measurement of each new vessel 10 in each static vessel holder 140, 140' can then be first carried out. After taking a photometric blank measurement of the vessel 10, the respective movable vessel workstations 160, 160' can transfer the vessels 10 to a free vessel placement positions for incubation 8, 8' of the respective static vessel holder 140, 140'. In the vessel placement positions for incubation 8, 8', a particular biological sample and one or more reagents can be dispensed into the vessel. The vessel 10B held by the gripper 161 can be transported to a free vessel placement positions for detection 6, 6' of the detection subunit 140B for detection by using the photometric unit 142 by linearly translating the movable vessel workstation 160. The detection by using the photometric unit 142 can include any one of the calibration and/or error detection techniques discussed above. In particular, reference factors (e.g., indicating a ratio of detected intensities in a second measurement channel 3l and a first reference measurement channel 3a) can be continuously updated and used in the measurement process as discussed above.

The system of FIG. 6 to FIG. 8 can use particular photometric units 142, 142'. In other examples, the photometric units 142, 142' can be replaced by any other optical measurement device of the present disclosure.

In the preceding sections, a plurality of signal processing steps has been described (e.g., steps of different techniques for calibration and/or error detection). Evidently, these signal processing steps can be performed on any suitable computer or computing system coupled to an optical measurement device according to the present disclosure. For instance, the optical measurement device itself can include a computer or computing system performing the signal processing steps of the different techniques for calibration and/or error detection. In other examples, the optical measurement device can be integrated in an analyzer for biological samples (e.g., the analyzer shown in FIG. 5 and FIG. 6) and a computer or computing system of the analyser can perform the signal processing steps of the different techniques for calibration and/or error detection. In still other examples, the optical measurement device can be communicatively coupled to a computer or computing system (e.g., a remote computer or computing system) performing the signal processing steps of the different techniques for calibration and/or error detection (e.g., through a laboratory communication network). In general, it is not important for the techniques for calibration and/or error detection of the present disclosure where the signal processing takes place.

Moreover, the methods for calibration and/or error detection of the present disclosure can be embodied in instructions on a computer-readable medium which when executed by a computer or computing system can cause the computer or computing system to carry out the steps of the methods for calibration and/or error detection of the present disclosure.

Furthermore, the particular features, structures, or characteristics may be combined in any suitable combinations and/or sub-combinations in one or more embodiment or example.

In the preceding detailed description multiple examples of compartments of the present disclosure have been discussed. However, the compartments of the present disclosure can also be configured as set out in the following aspects:

A method for calibration and/or error detection in an optical measurement device for biological samples having at least a first and a second measurement channel is presented. The method can comprise, between measurements of biological samples in the second measurement channel of the optical measurement device, repeatedly performing a reference factor update process including: obtaining one or more current reference factors for the second measurement channel, each reference factor being indicative of a relationship between measurement signals in the first and second measurement channels of the optical measurement device, determining a detection signal of the first measurement channel, determining a detection signal of the second measurement channel, calculating an updated reference factor for the second measurement channel based on the first and second detection signals, comparing the updated reference factor with at least one of the one or more current reference factors, and, depending on the result of the comparison, storing the updated reference factor as a current reference factor for use in a later measurement in the second measurement channel or keeping the one or more current reference factors for use in a later measurement in the second measurement channel.

The method can further comprise, if the updated reference factor deviates at most by a predetermined value from the at least one of the one or more current reference factors, storing the updated reference factor as a current reference factor for use in a later measurement in the second measurement channel and, if the updated reference factor deviates by more than the predetermined value from at least one of the one or more current reference factors, keeping the one or more current reference factors for use in a later measurement in the second measurement channel.

The method can further comprise, if the updated reference factor deviates at most by a predetermined value from the at least one of the one or more current reference factors, keeping the one or more current reference factors for use in a later measurement in the second measurement channel and, if the updated reference factor deviates by more than the predetermined value from at least one of the one or more current reference factors, producing an error message.

Calculating the reference factor can include determining a ratio of the first and second detection signals.

The first and second detection signals can indicate signal intensity in the respective measurement channel.

Using the one or more current reference factors in a later measurement in the second measurement channel can include determining a detection signal of the first measurement channel not including a biological sample, determining a detection signal of the second measurement channel including a biological sample to be measured, and correcting the detection signal of the second measurement channel by one of the current reference factors.

Using the one or more current reference factors in a later measurement in the second measurement channel can include determining a detection signal of the first measurement channel not including a biological sample, determining a detection signal of the second measurement channel not including a biological sample to be measured, and correcting the detection signal of the second measurement channel by one of the current reference factors.

Correcting the detection signal can include multiplying the detection signal with the one of the current reference factors or dividing the detection signal by the one of the current reference factors.

The method can further include storing a time stamp for each reference factor. The time stamp can indicate when the particular reference factor has been determined.

The time stamp can indicate a period of time since the respective reference factor has been determined or a point in time when the respective reference factor was determined.

The method can further comprise evaluating a time stamp of the current reference factor to determine an age of the current reference factor and generating an error message if an age of the current reference factor exceeds a predetermined maximum age.

Storing the updated reference factor as a current reference factor can include replacing a current reference factor.

The reference factors can be stored in a last-in-first-out manner such as, for example, in a ring buffer.

The reference factor update process can be performed continuously during operation of the optical measurement device.

The method can further comprise determining an estimated change of a reference factor and discarding an updated reference factor if the comparison updated reference factor does not change according to the estimated change.

The estimated change can be determined based on one or more environmental or device-related factors.

The reference factor update process can be performed periodically. A period of the periodic measurement factor update can be longer than a measurement time of a biological sample such as, for example, 1.1 to 5 times longer than a measurement time of a biological sample.

The reference factor update process can be performed at least once per minute. In one embodiment, it can be performed at least once per second.

The reference factor update process can be interrupted after detection of a predetermined interrupt trigger signal indicating that no measurement may take place in the near future.

A continuous reference factor update process can be started after detection of a predetermined starting trigger signal indicating that a measurement may take place in the near future.

The optical measurement device for biological samples can include one or more additional measurement channels. The method can further comprise, between measurements of biological samples in the second or one or more additional measurement channels of the optical measurement device, repeatedly performing the reference factor update process for each of the one or more additional measurement channels.

The optical measurement device for biological samples can include one or more additional measurement channels. The method can further continuously perform the reference factor update process for each of the one or more additional measurement channels.

The method can further comprise calculating an average value for the reference factors of all measurement channels of the optical measurement device including the first and second measurement channels; for each measurement channel including the first and second measurement channels, determining a deviation of a reference factor of the respective measurement channel and the average reference factor, and, if the deviation from the reference factor of a measurement channel and the average reference factor exceeds a predetermined limit, flag the respective measurement channel.

A reference factor of the first measurement channel can be set to a predetermined reference value. In one embodiment, it can be set to one.

If the deviation from the reference factor of the first measurement channel and the average reference factor exceeds a predetermined limit, an error state can be entered.

The method can further comprise calculating an average value for the reference factors of each measurement channel of the optical measurement device, determining a deviation of a reference factor of the first measurement channel and the average reference factor, and, if the deviation from the reference factor of the first measurement channel and the average reference factor exceeds a predetermined limit, generate an error indicator for the first measurement channel.

The average value can be a median or an arithmetic average.

The predetermined value can be static or dynamic.

The predetermined value can be determined based on an initial measurement of the reference factors.

Each measurement channel can include one or more input light guides arranged to guide light from a light source of the optical measurement device to a measurement position.

Each measurement channel can include one or more output light guides arranged to guide light from a light source of the optical measurement device to detector of the optical measurement device.

The optical measurement device can include a vessel holder for inserting a vessel including a biological sample to be measured in each measurement channel. The vessel holder can be a cuvette holder for holding a cuvette.

The measurement channels of the optical measurement device can be configured to conduct a transmission measurement on the biological sample.

The optical measurement device can be configured to analyze biological samples including blood, bone marrow, urine, semen, saliva, gastric fluid, mucus, peritoneal fluid, cerebrospinal fluid, bile, or sweat, or a constituent of blood, bone marrow, urine, semen, saliva, gastric fluid, mucus, peritoneal fluid, cerebrospinal fluid, bile or sweat, or a constituent of these bodily fluids, or a concentrated or diluted form of the fluids.

The first measurement channel can be a reference channel of the optical measurement device.

The method can further comprise delaying the use of the updated reference factor in a later measurement in the second measurement channel. The delay can be selected so that using updated reference factors determined during insertion or removal of another vessel containing the biological sample can be avoided.

A computer-readable medium having instructions stored thereon which when executed by a computer system can prompt the computer system to carry out the steps of the above methods.

An optical measurement device for biological samples is presented. The optical measurement device can comprise a first measurement channel, a second measurement channel, a detector configured to receive signals from the first and second measurement channels, and a controller configured to perform the above methods.

Each measurement channel can include one or more input light guides arranged to guide light from a light source of the optical measurement device to a measurement position.

Each measurement channel can include one or more output light guides arranged to guide light from a light source of the optical measurement device to detector of the optical measurement device.

The optical measurement device can include a vessel holder for inserting a vessel including a biological sample to be measured in each measurement channel. The vessel holder can be a cuvette holder for holding a cuvette.

The measurement channels of the optical measurement device can be configured to conduct a transmission measurement on the biological sample.

The first measurement channel can be a reference channel of the optical measurement device.

A method for calibration and/or error detection in an optical measurement device for biological samples having at least a first and a second measurement channel is presented. The method can comprise, during operation of the optical measurement device, repeatedly performing a reference factor update process including: obtaining one or more current reference factors for the second measurement channel, each reference factor being indicative of a relationship between measurement signals in the first and second measurement channels of the optical measurement device; determining a detection signal of the first measurement channel; determining a detection signal of the second measurement channel; calculating an updated reference factor for the second measurement channel based on the first and second detection signals; comparing the updated reference factor with at least one of the one or more current reference factors; and, depending on the result of the comparison, storing the updated reference factor as a current reference factor for use in a later measurement in the second measurement channel or keeping the one or more current reference factors for use in a later measurement in the second measurement channel.

An optical measurement device for biological samples is presented. The optical measurement device can comprise a first measurement channel, a second measurement channel, a detector configured to receive signals from the first and second measurement channels, and a controller configured to perform method for calibration and/or error detection in the optical measurement device using a method comprising, during operation of the optical measurement device, repeatedly performing a reference factor update process including the steps of: obtaining one or more current reference factors for the second measurement channel, each reference factor being indicative of a relationship between measurement signals in the first and second measurement channels of the optical measurement device; determining a detection signal of the first measurement channel; determining a detection signal of the second measurement channel; calculating an updated reference factor for the second measurement channel based on the first and second detection signals; comparing the updated reference factor with at least one of the one or more current reference factors; and, depending on the result of the comparison, storing the updated reference factor as a current reference factor for use in a later measurement in the second measurement channel or keeping the one or more current reference factors for use in a later measurement in the second measurement channel.

It is noted that terms like "preferably," "commonly," and "typically" are not utilized herein to limit the scope of the claimed embodiments or to imply that certain features are critical, essential, or even important to the structure or function of the claimed embodiments. Rather, these terms are merely intended to highlight alternative or additional features that may or may not be utilized in a particular embodiment of the present disclosure.

Having described the present disclosure in detail and by reference to specific embodiments thereof, it will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these preferred aspects of the disclosure.

We claim:

1. A method for calibration and/or error detection in an optical measurement device for biological samples having at least a first and a second measurement channel, wherein the first and second measurement channels are connected to a light source and a detector by optic fibers, the method comprising:
    guiding light from the light source to a biological sample in the second measurement channel via an optic fiber;
    collecting and guiding light emanating from the biological sample in the second measurement channel to the detector to obtain measurements of the biological sample in the second measurement channel;
    between measurements of biological samples in the second measurement channel of the optical measurement device, repeatedly performing a reference factor update process by a controller including:
        obtaining one or more reference factors for the second measurement channel, each reference factor being indicative of a relationship between previously obtained measurement signals in the first and second measurement channels of the optical measurement device;
        determining a first detection signal of the first measurement channel not including the biological sample by guiding light from the light source to the detector via an optic fiber in the first measurement channel;

determining a second detection signal of the second measurement channel;

calculating an updated reference factor for the second measurement channel based on the first and second detection signals;

comparing the updated reference factor with at least one of the one or more reference factors to a predetermined value;

if the comparison between the updated reference factor and the at least one of the one or more reference factors deviates at or less than the predetermined value, storing the updated reference factor as a reference factor for use in a later measurement in the second measurement channel; and if the comparison between the updated reference factor and the at least one of the one or more reference factors by more than the predetermined value, keeping the one or more reference factors for use in a later measurement in the second measurement channel and discarding the updated reference factors if it is determined that biological sample is present in the second measurement channel and generating an error message if it is determined that no biological sample is present in the second measurement channel and preventing further measurements in the second measurement channel by the optical measurement device.

2. The method according to claim 1, wherein calculating the reference factor includes determining a ratio of the first and second detection signals.

3. An optical measurement device for biological samples, the optical measurement device comprising:

a light source;

a first measurement channel;

a second measurement channel with the biological samples;

a movable vessel workstation configured to insert and remove the biological samples into the first and second measurement channels;

a detector configured to receive signals from the first and second measurement channels, wherein the first and second measurement channels are connected to the light source and the detector via optic fibers, wherein the optic fibers are configured to guide light from the light source to a biological sample in the second measurement channel, and wherein light emanating from the biological sample in the second measurement channel is collected by the detector to obtain measurements of the biological sample in the second measurement channel; and a controller configured to perform method for calibration and/or error detection in the optical measurement, the method comprising:

during operation of the optical measurement device, repeatedly performing a reference factor update process including the steps of:

obtaining one or more reference factors for the second measurement channel, each reference factor being indicative of a relationship between previously obtained measurement signals in the first and second measurement channels of the optical measurement device;

determining a first detection signal of the first measurement channel not including the biological sample;

determining a second detection signal of the second measurement channel;

calculating an updated reference factor for the second measurement channel based on the first and second detection signals;

comparing the updated reference factor with at least one of the one or more reference factors to a predetermined value;

if the comparison between the updated reference factor and the at least one of the one or more reference factors deviates at or less than the predetermined value, storing the updated reference factor as a reference factor for use in a later measurement in the second measurement channel; and if the comparison between the updated reference factor and the at least one of the one or more reference factors by more than the predetermined value, keeping the one or more reference factors for use in a later measurement in the second measurement channel and discarding the updated reference factors if it is determined that biological sample is present in the second measurement channel and generating an error message if it is determined that no biological sample is present in the second measurement channel and preventing further measurements in the second measurement channel by the optical measurement device.

* * * * *